Nov. 22, 1938.   C. F. WEGEHOFT   2,137,515
HOG-TONGUE PROTECTOR
Filed May 17, 1937
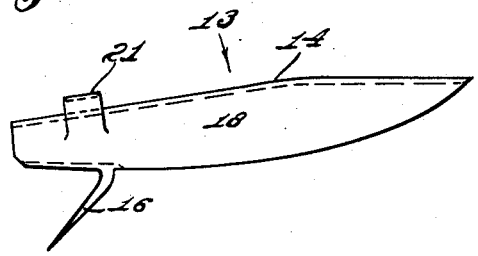
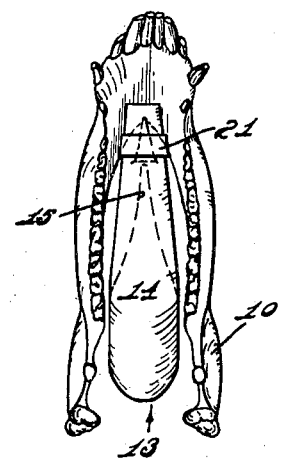
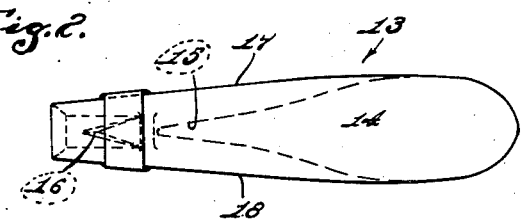
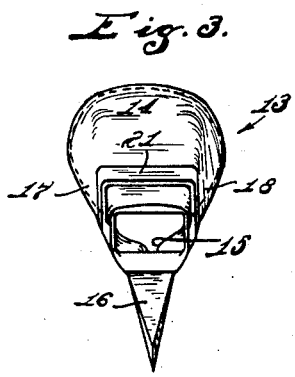
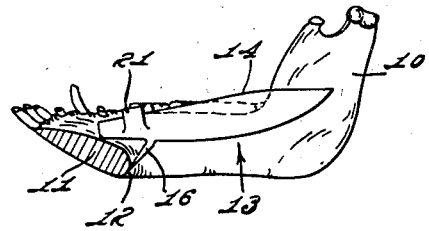
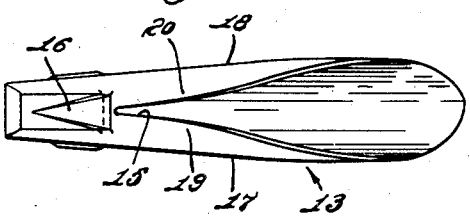
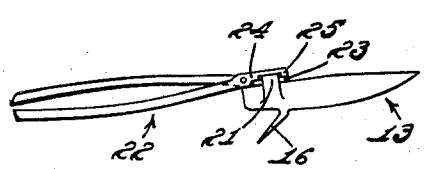
INVENTOR.
Chris F. Wegehoft,
BY Hood & Hahn
ATTORNEYS.

Patented Nov. 22, 1938

2,137,515

UNITED STATES PATENT OFFICE 2,137,515

HOG-TONGUE PROTECTOR

Chris Fredrick Wegehoft, Indianapolis, Ind., assignor to Kingan & Co., Incorporated, Indianapolis, Ind., a corporation of New Jersey Application May 17, 1937, Serial No. 142,986

7 Claims. (Cl. 17—1)

The present application relates to animal tongue protectors, and more particularly to devices for protecting the tongues of hogs in slaughter houses.

As is apparent from the above statement, the primary object of the present invention is to provide means for protecting the tongues of animals, and more particularly of hogs, against damage during the progress of the animal through a slaughter house. Further objects will appear as the description proceeds.

Pork tongues are a delicacy, and command a relatively high price. They must, however, be perfect and free from injuries. If a tongue is damaged, the regulations require that the damaged portion shall be cut off and thrown into tankage which is sold for practically nothing.

In the progress of a hog through a packing house, the animal is slaughtered by slashing his throat, whereafter he is suspended by a hind foot, the blood is permitted to drain out, and then the carcass is immersed in hot water, whereby the hair is loosened.

Again suspended by a hind leg, the carcass is slowly moved through a long corridor between a plurality of shafts which carry stiff leather straps armed with metal scrapers, the shafts rotating at relatively high speed, and the armored straps beating the carcasses violently, whereby the hair is scraped away. In view of the manner in which the carcass is suspended, the action of the beaters causes the head to be violently shaken, and the loose lower jaw claps violently against the upper jaw.

A hog's jaws are provided with vicious teeth, and his tongue is quite long, so that as much as an inch and a half or two inches of the tongue may project, at times, between the teeth. As a result, unless the tongue is in some manner protected, an inch and a half to two inches of the tongue will be lacerated and punctured by the action of the teeth when the carcass emerges from the dehairing room.

It has heretofore been proposed to provide a metal sheath for the tongue, such sheath substantially encasing the entire length of the tongue and being anchored, by a prong, to the roof of the mouth at a point closely adjacent to the root of the tongue. Because of the violence with which the head of the carcass is snapped back and forth during the dehairing operation, however, it has been found in practice that such devices are very frequently dislodged, fall out of the mouth, and are lost with the discharge of hair from the carcasses. It is an important object of the present invention to overcome that defect of the hitherto known device, and to provide a protecting sheath which may be readily inserted, which will invariably remain in place throughout the dehairing operation, and which may be readily removed after its function has been performed.

To the accomplishment of the above and related objects, my invention may be embodied in the form illustrated in the accompanying drawing, attention being called to the fact, however, that the drawing is illustrative only, and that change may be made in the specific construction illustrated and described, so long as the scope of the appended claims is not violated.

Fig. 1 is a side elevation of a protector constructed in accordance with the present invention;

Fig. 2 is a top plan view thereof;

Fig. 3 is an end elevation thereof;

Fig. 4 is a top plan view of a hog's mandible with a protector constructed in accordance with the present invention in place therein;

Fig. 5 is a substantially central longitudinal section therethrough;

Fig. 6 is a bottom plan view of a protector constructed in accordance with the present invention; and Fig. 7 is a side elevation, upon a reduced scale, of a protector having associated therewith a tool for manipulating the same.

Referring more particularly to the drawing, it will be noted that the mandible 10 of a hog differs from the human mandible largely in the length of the horizontal portion thereof, and further in the fact that the anterior portion of the mandible is of considerably greater longitudinal extent, slopes downwardly and rearwardly, and is formed, at its posterior edge, with a socket or undershot portion 12. I have taken advantage of this construction in providing means for anchoring my protector against displacement.

The reference numeral 13 designates generally my tongue protector. It comprises a generally tubular element, open at its opposite ends, and formed with an upper surface 14 substantially contoured to the shape of the roof of the animal's mouth. The opposite surface of the protector 13 is formed with a tapered slot 15 extending from the posterior end of the protector to a point adjacent the anterior end thereof, said slot being provided for the accommodation of the frenum linguae. At a point between the anterior end of the slot 15 and the anterior end of the protector, there projects downwardly and forwardly from said surface a sharpened prong 16.

The surface 14 and the surface from which the prong 16 projects are joined by lateral walls 17 and 18 which are curled under as at 19 and 20 to protect the inferior surfaces of the lateral edges of the tongue, and to form the boundaries of the slot 15.

From the superior surface 14 of the protector there projects upwardly a metal strap 21 with which may be associated a manipulating tool indicated generally by the reference numeral 22. Said tool comprises two jaw members 23 and 24, the member 23 being plane and the member 24 being provided with a terminal finger 25 which, when the tool is associated with the strap 21, engages the posterior edge of the upper surface of the strap 21.

The protector of the present application is used as follows:—

At some point in the line after the animal has been killed and before the carcass is carried into the dehairing corridor, the mouth is opened and a protector, held by a tool 22, is inserted into the mouth, preferably having been rotated through an angle of approximately 90 degrees about its longitudinal axis. The posterior open end of the protector is slipped over the tip of the tongue and the protector is then forced toward the root of the tongue, simultaneously being turned, about its longitudinal axis, toward the position illustrated in Fig. 5. The frenum linguae is received freely in the slot 15, and the posterior end of the protector is forced back to the root of the tongue. Since the protector is open at both ends, the tongue, which is covered with a mucous-like deposit and is therefore quite slippery, slides freely through the length of the protector; but, the protector being tapered, as is clearly illustrated in the drawing, the tongue will not protrude, in most instances, through the open anterior end of the protector.

As the posterior end of the protector reaches the region of the tongue root, the anterior end of the protector is forced by the tool downwardly until the sharpened end of the prong 16 engages beneath the undershot posterior edge of the distal portion 11 of the mandible. The jaws 23 and 24 of the tool 22 are then separated, and the tool is removed.

It will be seen that the protector is thus wedged in place between the distal portion of the mandible and the anchored root of the tongue. The natural resiliency of the tongue, plus the tendency of gravity (the carcass being hung head downwardly) tends to urge the protector toward the distal portion of the mandible; but the prong 16, engaged as it is beneath the overhanging portion of the bone, prevents any movement under such urge; and thereby the protector is held against any movement with respect to the mandible, except movement toward the root of the tongue. Since there is no force existing which will naturally tend to move the protector toward the root of the tongue, it follows that the protector is firmly anchored in place with respect to the mandible.

Now, when the carcass is carried through the dehairing corridor, regardless of the violence with which the head and the mandible may be jerked about, the protector will remain in place, and the tongue will be absolutely protected against damage by the teeth.

When the carcass emerges from the dehairing corridor, the tool 22 is again engaged with the strap 21 and, by downwardly-inward pressure, the prong 16 is disengaged from the mandible, whereupon the protector may be readily withdrawn from the tongue.

Practical experience with the protector of the present application has demonstrated the fact that it is readily applied, remains firmly in place throughout the dehairing operation, may be readily withdrawn after the dehairing operation, and absolutely protects the tongue against damage. It will be obvious that, necessarily, the protector must be supplied to packing houses in several sizes to correspond to the various sizes of hogs which are slaughtered. It is my present belief that three sizes will be sufficient to take care of all sizes of hogs customarily slaughtered.

I claim as my invention:

1. A protector for an animal's tongue comprising a generally tubular element adapted to encompass the tongue substantially from the tip to the base thereof, and means carried by said element and engageable with the mandible to anchor said element against movement.

2. A protector for an animal's tongue comprising a generally tubular element adapted to encompass the tongue substantially from the tip to the base thereof, and means carried by said element and engageable beneath a rearwardly-projecting portion of the distal section of the mandible to anchor the anterior end of said element against movement.

3. A protector for an animal's tongue comprising a generally tubular element open at both ends and tapering from one end to the other, said element being formed in one surface with a slot tapering from said one end toward said other end, and a prong projecting from a portion of said surface between the narrow end of said slot and the adjacent end of said element and projecting in the direction of said last-named end, said element being adapted to encase an animal's tongue substantially from the root to the tip thereof, said slot being adapted to permit the passage of the frenum linguae, and said prong being engageable beneath a rearwardly-projecting portion of the distal part of the animal's mandible.

4. A protector for an animal's tongue comprising a generally tubular element adapted to encase the superior and lateral surfaces of an animal's tongue and to encase also that portion of the inferior surface thereof anterior to the point of connection of the frenum linguae, said element being provided, adjacent its anterior end, with means for anchoring said end of said element against movement with respect to the animal's mandible.

5. A protector for an animal's tongue comprising a substantially tubular open-ended metallic element adapted to be slipped over an animal's tongue to encase that portion thereof subject to injury by the animal's teeth, said element having a portion positionable substantially at the root of the tongue, and means carried by said element and engageable with the anterior portion of the animal's mandible to wedge said element between the tongue root and said portion of the mandible.

6. A protector for an animal's tongue comprising a substantially tubular open-ended metallic element having a surface substantially contoured to the shape of the roof of an animal's mouth and being provided on an opposite surface with a slot for accommodating the animal's frenum linguae and with a prong engageable with an anterior portion of the animal's mandible.

7. A protector for an animal's tongue comprising a tooth-resisting sheath adapted to encase a tongue substantially from the root thereof to the tip thereof, a downwardly- and forwardly-projecting sharpened prong projecting from the inferior surface thereof adjacent the tip-end thereof and engageable with the anterior portion of the animal's mandible, and a rigid strap carried by the superior surface thereof adjacent the tip-end thereof for engagement by a tool for manipulation of said protector.

CHRIS FREDRICK WEGEHOFT.